United States Patent [19]
Smith

[11] Patent Number: 5,887,934
[45] Date of Patent: Mar. 30, 1999

[54] TONNEAU COVER SUPPORT SYSTEM FOR TRUCK BEDS

[75] Inventor: Daniel G. Smith, Grand Prairie, Tex.

[73] Assignee: Texas Saddlebags, Inc., Arlington, Tex.

[21] Appl. No.: 775,423

[22] Filed: Dec. 30, 1996

[51] Int. Cl.[6] .................................................. B60P 7/04
[52] U.S. Cl. ..................... 296/100.16; 410/110; 410/145
[58] Field of Search ............................... 296/32, 34, 36, 296/100, 100.04, 100.07, 100.15, 100.16, 100.17, 100.18; 410/104, 110, 115, 116, 144, 145, 149

[56] References Cited

U.S. PATENT DOCUMENTS

| | | | |
|---|---|---|---|
| 3,373,464 | 3/1968 | Ausnit | 24/576 |
| 4,036,521 | 7/1977 | Clenet | 296/100 |
| 4,061,394 | 12/1977 | Vodin | 296/100 |
| 4,639,033 | 1/1987 | Wheatley et al. | 296/100 |
| 4,647,103 | 3/1987 | Walblay | 296/100 |
| 4,650,383 | 3/1987 | Hoff | 410/149 |
| 4,757,854 | 7/1988 | Rippberger | 160/391 |
| 4,792,179 | 12/1988 | Stevens | 296/100 |
| 4,936,724 | 6/1990 | Dutton | 296/100 X |
| 5,228,736 | 7/1993 | Dutton | 296/100 X |

*Primary Examiner*—Andrew C. Pike
*Attorney, Agent, or Firm*—Daniel Rubin

[57] ABSTRACT

A tonneau support system for the bed of a pickup truck can be interchangeably utilized between supporting a bed cover, supporting load bars to load lock cargo, or support tie down straps to tightly overlie cargo in the course of being hauled. The elongated side rails are secured against opposite walls of the truck bed and include side grooves in which to removably secure the perimeter of the cover, and apertures in which to removably support displaceable load bars for load locking cargo or alternatively to receive hook ends of a tie-down strap to secure a load when hauled.

2 Claims, 4 Drawing Sheets

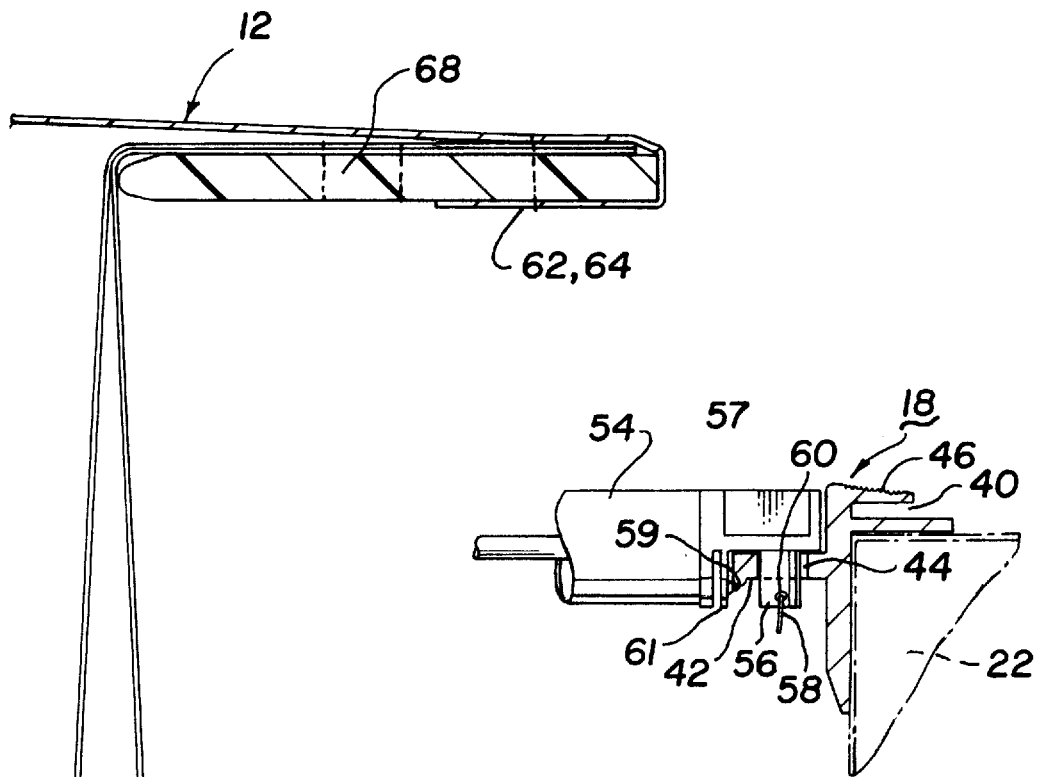
Fig. 5
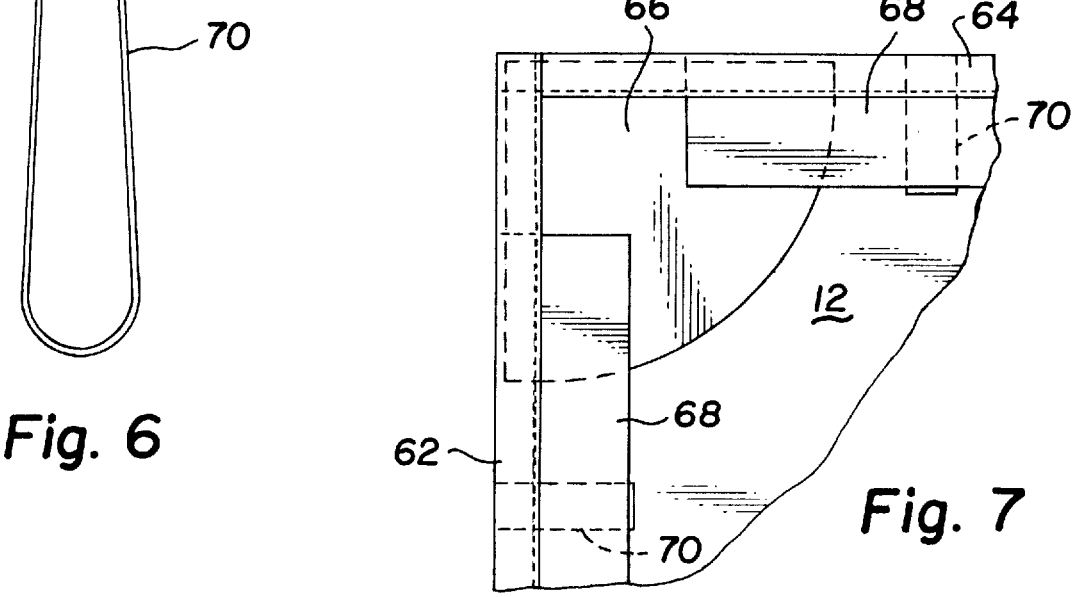
Fig. 6
Fig. 7

TONNEAU COVER SUPPORT SYSTEM FOR TRUCK BEDS

FIELD OF THE INVENTION

The field of art to which the invention relates comprises the art of pickup trucks and bed covers therefor.

BACKGROUND OF THE INVENTION

Pickup trucks currently represent a substantial proportion of the vehicles on American roads, particularly in the southwestern part of the country. They are particularly suitable for cargo hauling via the truck bed in which the cargo can be either covered for weather protection or uncovered and exposed to the elements. Depending on the shape and height of the cargo it can be load locked or tied down by use of straps that are frequently resorted to in the course of hauling. The typical truck bed is about 50–60 inches in width and less than about 97 inches in length.

The use of a bed cover termed a "tonneau" when utilized overlies the bed and is commonly employed for weather protection of the cargo. A tonneau installation typically requires a plurality of intersecting rails by which the tonneau cover is supported. Snaps secure the cover in place. Use of the bed for tie down when required and/or load lock without the cover usually involves disassembly and removal of rails and related components supporting the cover and installation of alternate components for these applications. These units must subsequently be re-interchanged when the cover is to be re-installed. Typically, two persons are required to remove and install the tonneau cover. Yet failure to remove the cover support system, when alternative uses of the truck bed are contemplated, severely limits the cargo hauling capacity of the truck. A form of tonneau cover installation is disclosed in U.S. Pat. No. 4,757,854.

OBJECTS OF THE INVENTION

It is therefore an object of the invention to provide a novel tonneau support system for the bed of a pickup truck that when installed affords an aesthetically pleasing appearance of the cover and yet is suitable for use either with or without a tie down without requiring component removal in the manner of the prior art.

It is a further object of the invention to effect the previous object with a system that also affords variably located load locks adjustably pre-settable to maintain a cargo against shifting when hauled.

It is a further object of the invention to effect the previous objects with a created system of interchangeable accessories.

It is a still further object of the invention to effect the previous object with a tonneau cover that is easily installed in minutes and when removed can be folded and stored behind the cab seat.

SUMMARY OF THE INVENTION

This invention relates to a tonneau support system for pickup trucks. More specifically, the invention relates to a tonneau support system for pickup trucks affording wide versatility in the vehicle aftermarket including adaptation for a variety of different truck manufacturers with a flexibility of utilization not previously known.

The foregoing is achieved in accordance herewith utilizing a pair of opposite side rails attached to the side walls of the truck bed with each having about 18–24 longitudinally matched tie down apertures. Adjustable length load lock crossbars transversely placed between the side rails permit placement at any desired longitudinal location along the side rails without regard to any dimensional changes in width of the bed. The cross bars are insertable into place through the tie-down apertures of the side rails where they can be individually secured via a cotter pin and removed for relocation when desired. Each tie down aperture is constructed to withstand at least 1400 lbs. horizontal pullout force in the tie-down system using a ½-inch pin.

When not used for tie down or load lock, the same side rails and cross bars are utilized for tonneau cover support. The installation of the tonneau cover is easily accomplished by slipping a plastic elongated slat attached about the perimeter of the cover snugly into grooves formed in the side rail in a tongue and groove or tuck-in relation. Being continuous, the slat effects a continuous closure seal in contrast to the previously utilized snap-on connections that are only tight at the snap location. At the same time a tonneau cover when installed presents a low profile appearance that can support a load in excess of 1000 lbs. It can be accessed for removal attached to any corner by means of pull tabs hanging attached to the cover.

The above noted features of the invention as well as other superior aspects thereof will be further appreciated by those skilled in the art upon reading the detailed description which follows in conjunction with the drawings.

BRIEF DESCRIPTION OF THE DRAWINGS

FIG. 5 is a sectional view as seen substantially from the position 5—5 of FIG. 2;

FIG. 6 is an enlarged fragmentary sectional view illustrating installation of the tonneau cover;

FIG. 7 is a fragmentary underside plan view of a tonneau cover corner;

DESCRIPTION OF THE PREFERRED EMBODIMENT

Figure 1:
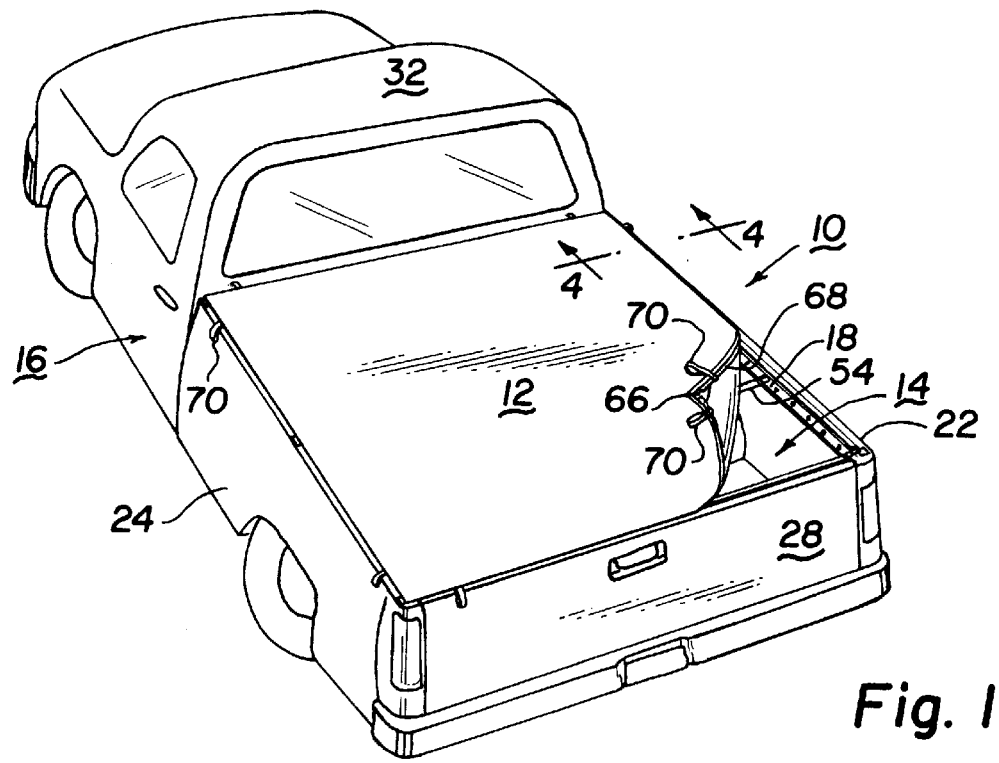
FIG. 1 is a top isometric view of a pickup truck utilizing the tonneau support system of the invention.
Figure 2:
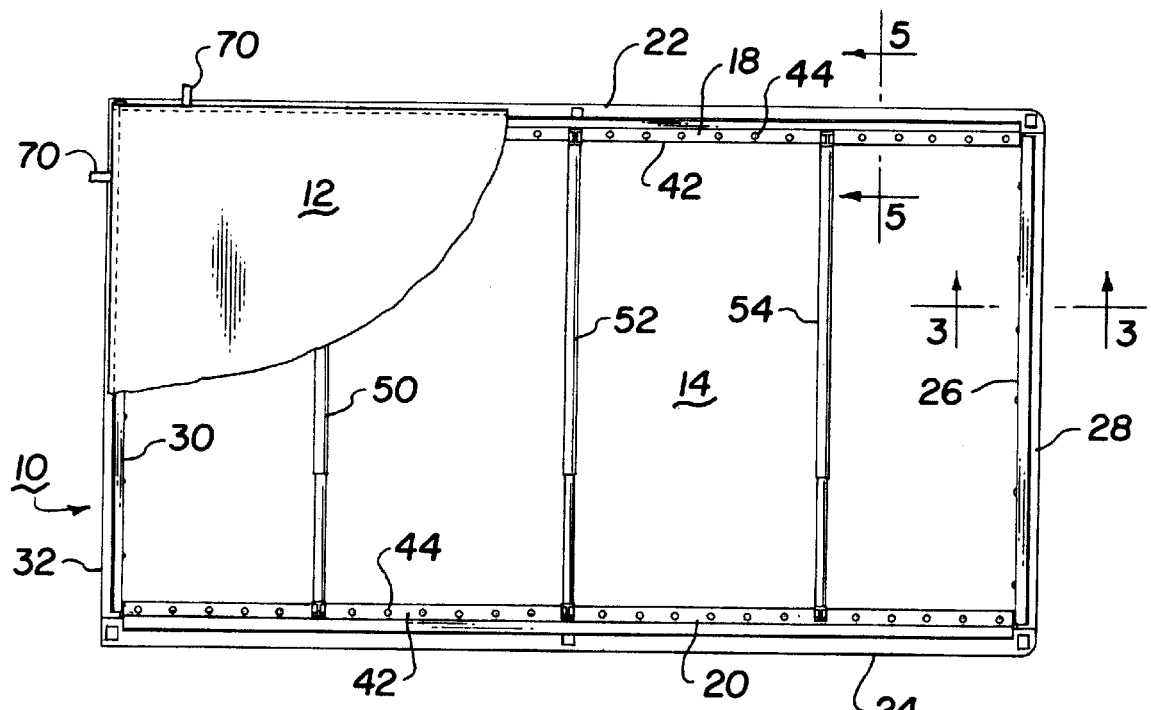
FIG. 2 is a plan view of the tonneau support system.
Figure 3:
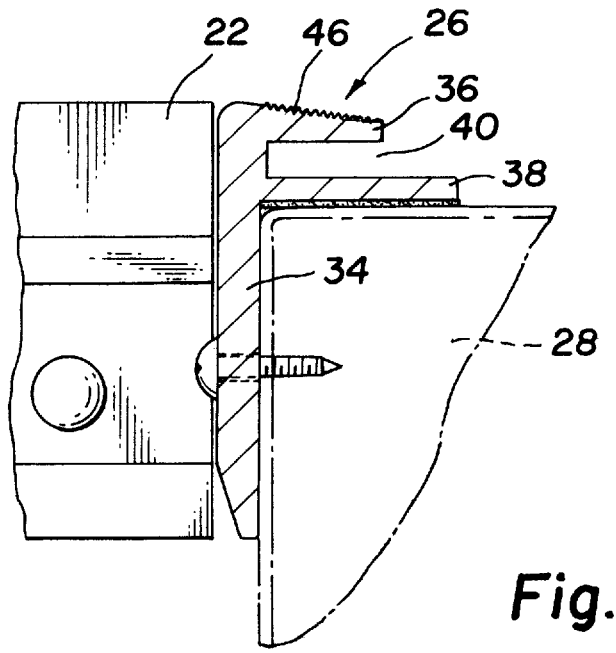
FIG. 3 is a sectional view as seen substantially from the position 3—3 of FIG. 2.

In the description which follows, like parts are marked throughout the specification and drawings with the same reference numerals respectively. The drawing figures are not necessarily to scale and in certain views proportions may have been exaggerated for purposes of clarity.

Referring now to the drawings, there is illustrated in FIG. 1 the tonneau support system hereof, designated 10, that includes a cover 12 for overlying the bed 14 of a pickup truck 16.

Comprising the system hereof is a pair of opposite side rails 18 and 20 to be secured respectively to the opposite sidewalls 22 and 24 of bed 14. At opposite ends of the bed there is provided end rail 26 secured to tailgate 28 and end rail 30 secured to the back end of the truck cab 32.

All of the side rails include an upright support wall 34 for attachment to the truck wall thereat. They are formed of cast aluminum sections that, at their upper end, include a pair of spaced-apart parallel fingers 36 and 38 extending laterally outward and defining a longitudinal groove 40 therebetween. At an intermediate height of the sidewall 34 for side rails 18 and 20 there is included a longitudinal laterally inward extending integral side arm 42 that contains a plurality of apertures 44 longitudinally spaced uniformly at about four inch centers. The upper surface of finger 36 is downwardly tapered and includes a serrated portion 46 for reasons as will be understood. A gasket 48 is normally positioned intervening between the underside of finger 38 and the top surface of the truck wall thereat. End rails 26 and 30 are similar to rails 18 and 20 but lack the longitudinal sidearm 42.

For supporting the tonneau cover 12 and/or effecting load lock there is provided removably securable load bars 50, 52, and 54. The load bars are telescopically extendable in a well known manner to accommodate any dimensional variation between the side rails 18 and 20. At each end, the load bars include a dependent pin 56 in a lug 57 for insertion through a rail aperture 44 at any selected longitudinal location of an aperture 44 along the length of bed 14. A lateral nub 59 on dependent flexible web 61 engages the end face of side arm 42 to receive pin 56 in a snap-in relation and hold the lock bar in place. Once in place, a cotter pin 58 is secured in a small diameter cross bore 60 so as to preclude inadvertent pullout of the pin 56 from an aperture 44. Longitudinal displacement therefore of a load bar between apertures 44 requires only that the cotter pins be removed and the load bar be unsnapped and relocated to another site.

Figure 4:
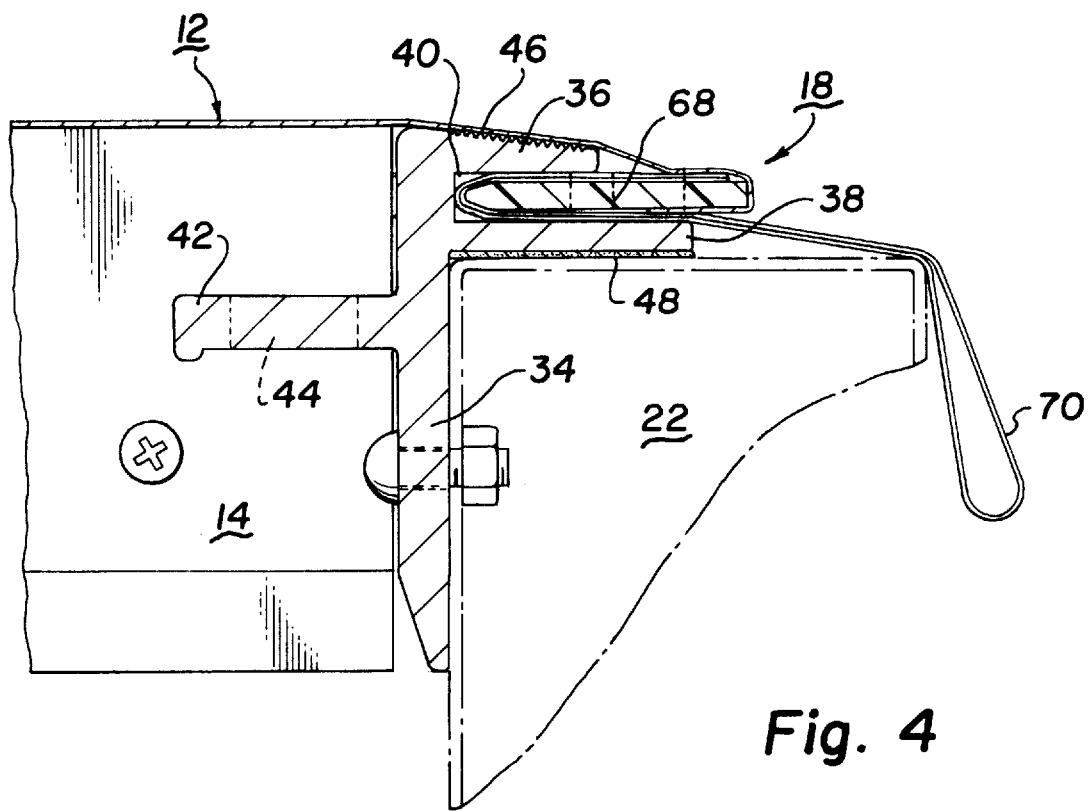
FIG. 4 is a sectional view as seen substantially from the position 4—4 of FIG. 1.

Cover 12 is of a water resistant relatively firm composition and in a preferred embodiment is comprised of a synthetic plastic sheet such as Heartz (tm) vinyl. The cover is normally custom sized to fit the specific truck bed with which it is to be utilized in order to effect a low profile aesthetically pleasing appearance. As best seen in FIG. 7, the cover includes perimeter reinforcement strips 62 and 64 along the peripheral edges and a reinforcement sector 66 at each of the individual corners. For reasons as will be understood, the cover includes an overlap area about its periphery. Secured to the overlap for cover installation and removal as best seen in FIGS. 4 and 6 is a relatively thin plastic slat 68 which along the sides and rear is of a thickness as will enable snug insertion into open groove 40 of side rails 18, 20, 26, and 30. Secured to the slats about the corner locations are a plurality of hanging straps 70 that remain continuously exposed at their ends for ready access and, when drawn, withdraw the slat 68 to release the cover for easy removal. The cover can then be folded and stored and then re-installed when desired.

Figure 8:
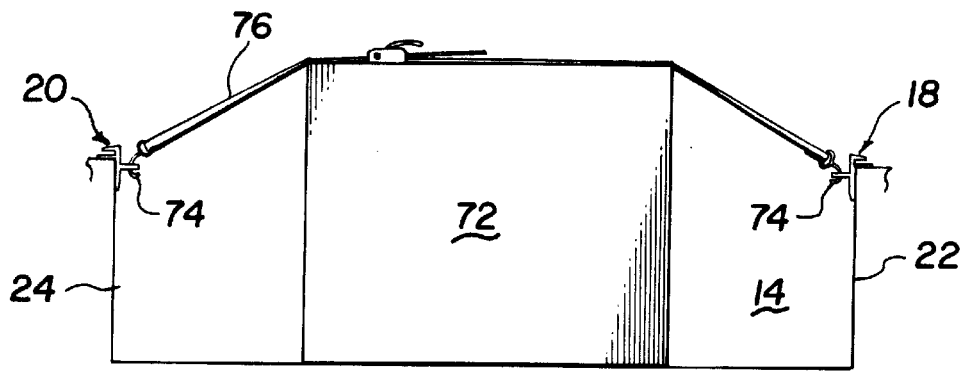
FIG. 8 is a sectional elevation utilizing the system hereof in a tie-down relation.

With reference to FIG. 8, tie-down applications typically require that cover 12 be removed, without removing the support system 10, for an exemplary load 72 positioned on the support surface of bed 14. Opposite end hooks 74 of a load strap 76 are inserted into the side rail apertures 44 of choice for securing the load in place. It can be recognized and appreciated that with the vast number of longitudinally spaced apertures 44, multiple straps can be utilized in combination even in a criss-cross relation to create a heavy-duty tie-down system on site.

Figure 9:
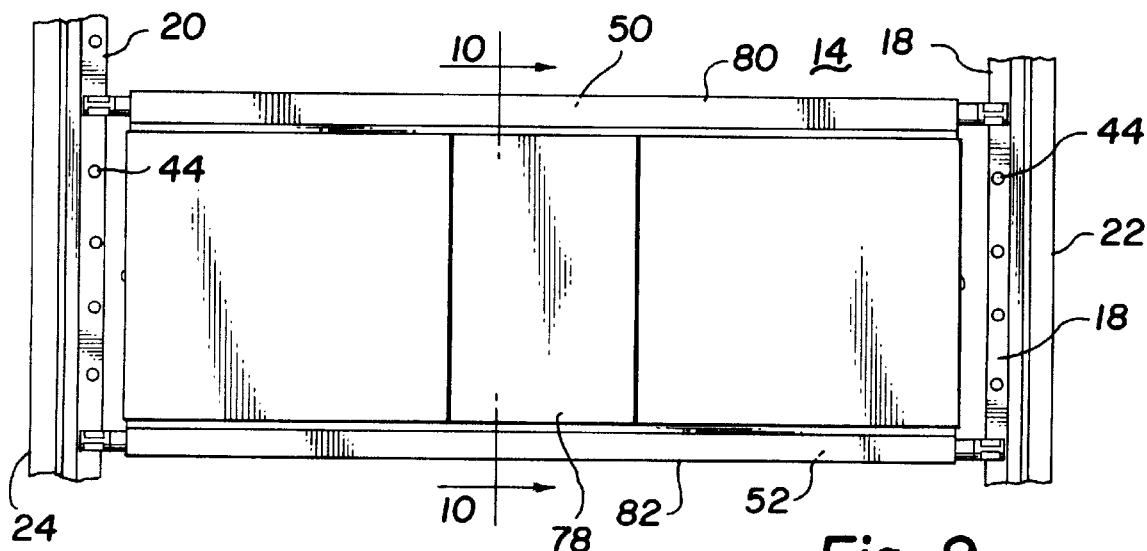
FIG. 9 is a plan view utilizing the system hereof in a load-lock relation with an exemplary tool box.
Figure 10:
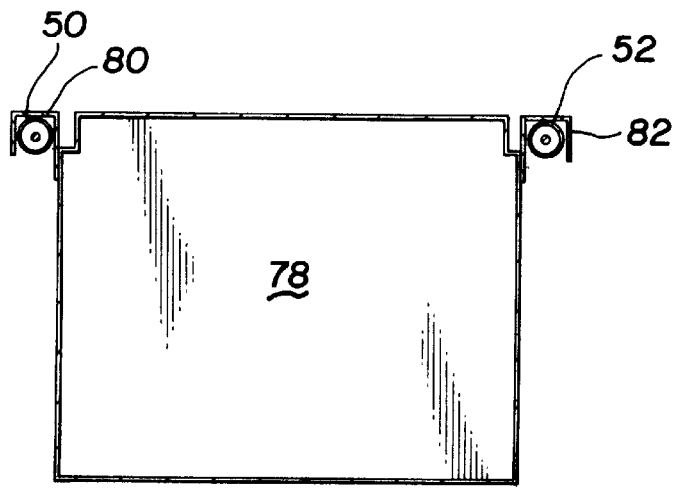
FIG. 10 is a sectional elevation as seen substantially along the lines 10—10 of FIG. 9.

For load lock operation to secure a load 78, one or both load bars 50 and 52 are relocated via apertures 44 until they are contiguously juxtaposed to the load location. Where one side of the load is positioned against a rail 26 or 30, only one load bar is required. Accessories can be hung from the load bars via opposite channels 80 and 82 as, for example, shown in FIGS. 9 and 10. Accessories such as a tool box, cargo net, bike lock, gun or fishing pole storage, etc. can be added by using channels 80 and 82 for mounting to the hole pattern 44. Where the upper surface of the load is substantially at the same height of the load bars, cover 12 can optionally be placed thereover or left off if preferred.

By the above description there is disclosed a novel tonneau support system that enjoys a versatility of being commonly utilized to support a tonneau cover, to provide a load lock, and/or to provide a load tie-down. The virtues are many, not the least of which is the elimination of disassembly and reassembly of the support components in the manner of the prior art for effecting the alternative uses. With a one-time installation, interchangeability is effected in a matter of minutes without the tedious change out activity normally resorted to in the manner of the prior art.

Since many changes could be made in the above construction and many apparently widely different embodiments of this invention could be made without departing from the scope thereof, it is intended that all matter contained in the drawings and specification shall be interpreted as illustrative and not a limiting sense.

I claim:

1. A tonneau support system for a bed of a pickup truck comprising:

a pair of elongated side rails, one of which is longitudinally attachable to one side wall of the truck bed and another of which is longitudinally attachable to another side wall of the truck bed, said side rails each including a longitudinal groove defined at an exposed location about a perimeter of the bed;

a tailgate rail attachable to a tailgate end of said bed having a longitudinal groove defined at an exposed location and defining with said side rails corner locations about said bed;

a plurality of longitudinally spaced elongated load bars removably attachable to said side rails transversely therebetween; and a weather protective cover substantially conforming to the bed sought to be covered and including perimeter areas overlapping the side walls and tailgate end of said bed enabling a snug attachment and removal of the overlapping perimeter areas to and from the longitudinal grooves of said rails;

said cover further including a plurality of free hanging straps spaced at least about perimeter portions of the cover about said corner locations for enabling removal of said cover from said rails.

2. A support system in accordance with claim 1 in which said straps are contained on intersecting edges defining each cover corner.

* * * * *